United States Patent [19]

Hand et al.

[11] Patent Number: 5,287,648
[45] Date of Patent: Feb. 22, 1994

[54] ELECTRICAL SUPPORT STRUCTURE AND METHOD AND APPARATUS FOR PREVENTING CRAWLING INSECTS OR OTHER CRAWLING PESTS FROM ENTERING ELECTRICAL DEVICES MOUNTED ON SUPPORT STRUCTURES ABOVE GROUND

[76] Inventors: Herbert H. Hand, 223 Tram Rd., Columbia, S.C. 29201; Herbert G. Hand, 601 Mack St., Gaston, S.C. 29053

[21] Appl. No.: 561,375

[22] Filed: Aug. 1, 1990

Related U.S. Application Data

[63] Continuation-in-part of Ser. No. 434,411, Nov. 13, 1989, abandoned, which is a continuation-in-part of Ser. No. 271,040, Nov. 15, 1988, Pat. No. 4,905,629, which is a continuation-in-part of Ser. No. 133,171, Dec. 11, 1987, Pat. No. 4,784,086, which is a continuation-in-part of Ser. No. 914,335, Oct. 2, 1986, abandoned.

[51] Int. Cl.⁵ ............................................. A01M 1/10
[52] U.S. Cl. ....................................... 43/121; 43/108
[58] Field of Search ............... 43/107, 108, 109, 120, 43/121; 47/23, 24

[56] References Cited

U.S. PATENT DOCUMENTS

| 42 | 4/1841 | Newhall | 43/108 |
|---|---|---|---|
| 44,238 | 9/1864 | Towne . | |
| 46,298 | 2/1865 | Hilton | 43/108 |
| 49,453 | 8/1865 | Starbuck | 43/108 |
| 57,937 | 9/1866 | Mathews . | |
| 479,980 | 8/1892 | Gordon | 43/109 |
| 481,311 | 8/1892 | Smith . | |
| 784,684 | 3/1905 | Karlsen . | |
| 1,221,999 | 4/1917 | Kreiter . | |
| 1,496,720 | 6/1924 | Marsico . | |
| 1,579,534 | 4/1926 | Hibbert et al. . | |
| 2,012,651 | 8/1935 | Beall . | |
| 2,112,229 | 3/1938 | Davis . | |
| 2,138,182 | 11/1938 | Lipthrott . | |
| 2,139,225 | 12/1938 | Easling . | |
| 2,149,495 | 3/1939 | Barnard et al. . | |
| 2,150,891 | 3/1939 | Tennison . | |
| 2,165,500 | 7/1939 | Muirhead . | |
| 2,191,811 | 2/1940 | Trampier, Sr. . | |
| 2,242,266 | 5/1941 | Scales . | |
| 2,253,541 | 8/1941 | Torbett . | |
| 2,258,317 | 10/1941 | Clipper . | |
| 2,315,989 | 4/1943 | Tennison et al. . | |
| 2,554,086 | 5/1951 | Block . | |
| 2,584,301 | 2/1952 | Sinclair . | |
| 2,677,350 | 5/1954 | Prestidge et al. . | |
| 2,746,201 | 5/1956 | Warrell . | |
| 2,796,042 | 6/1957 | Cope . | |
| 2,813,509 | 11/1957 | Bruno . | |
| 3,147,739 | 9/1964 | Shaheen . | |
| 3,195,510 | 7/1965 | Berstein . | |
| 3,441,003 | 4/1969 | Dumond et al. . | |
| 3,664,304 | 5/1972 | Carter . | |
| 3,722,476 | 3/1973 | Van Ness et al. . | |
| 3,995,595 | 12/1976 | Williams . | |
| 4,098,018 | 7/1978 | Bartelme . | |
| 4,128,080 | 12/1978 | Haney . | |
| 4,328,636 | 5/1982 | Johnson . | |
| 4,357,905 | 11/1982 | Carpenter . | |
| 4,399,772 | 8/1983 | Salinas . | |
| 4,423,564 | 1/1984 | Davies et al. . | |
| 4,428,325 | 1/1984 | Koch . | |
| 4,471,562 | 9/1984 | Brucker . | |
| 4,691,664 | 9/1987 | Crowell . | |
| 4,756,116 | 7/1988 | Cutter . | |
| 4,784,086 | 3/1990 | Hand et al. . | |
| 4,800,845 | 1/1989 | Budd . | |
| 4,905,629 | 11/1988 | Hand et al. . | |

FOREIGN PATENT DOCUMENTS

| 2453952 | 12/1980 | France . | |
|---|---|---|---|
| 0472883 | 10/1937 | United Kingdom | 43/109 |

OTHER PUBLICATIONS

Webster's II new Riverside Dictionary, 1984 Houghton Mifflin Co. p. 809.
Sears Roebuck Catalog, p. 1348.

Primary Examiner—Paula A. Bradley
Assistant Examiner—James Miner
Attorney, Agent, or Firm—McAndrews, Held & Malloy, Ltd.

[57] ABSTRACT

A pest preventer for placement between the ground and an electrical device mounted above ground in such a way that crawling insects or pests are prevented from entering the electrical device. A combination of -tactic, ultraviolet light and other barriers are positioned with respect to the path of travel of the insect from ground to the electrical devices.

33 Claims, 7 Drawing Sheets

ELECTRICAL SUPPORT STRUCTURE AND METHOD AND APPARATUS FOR PREVENTING CRAWLING INSECTS OR OTHER CRAWLING PESTS FROM ENTERING ELECTRICAL DEVICES MOUNTED ON SUPPORT STRUCTURES ABOVE GROUND

RELATED PATENT APPLICATIONS

This application is a continuation-in-part of application Ser. No. 0-7/434,411 filed Nov. 13, 1989, now abandoned which is a continuation-in-part of application Ser. No. 07/271,040 filed Nov. 15, 1988, now U.S. Pat. No. 4,905,629, which is a continuation-in-part of application Ser. No. 07/133,171 filed Dec. 11, 1987, now U.S. Pat. No. 4,784,086, which is a continuation-in-part of application Ser. No. 914,335 filed Oct. 2, 1986, now abandoned. All of these prior applications are incorporated herein by reference.

BACKGROUND OF THE INVENTION

The invention relates to electrical, electromagnetic, and/or electronic devices mounted above ground via support structures including poles, guy wires, pads, etc. and more particularly relates to a method and apparatus for preventing crawling insects or pests from entering such electrical devices.

Electrical devices, including electronic and electromagnetic devices, are typically mounted above ground by support structures such as poles, pads, utility stations, etc. On occasion, facilitating structures such as guy wires, grounding wires, conduits, and electrical cabling are connected to such support structures.

Presently, highly toxic poisons are positioned across the pathway leading to such electrical devices to prevent crawling insects from reaching critical areas of the devices in which an insect intrusion could cause service outages, signal distortions, or problems to people servicing the equipment. Such toxic substances must be periodically replaced if they are to preclude crawling insects. In some cases, the toxic substances attract, rather than repel, the insects. The most effective toxic substance, chlordane, has recently been banned by the Environmental Protection Agency.

It is, therefore, an object of the present invention to provide a method and apparatus for use in such an environment for preventing crawling insects from reaching electrical, including electromagnetic and electronic, devices.

It is another object of the present invention to preclude crawling insects from infesting poles mounted in the ground.

It is a further object of the present invention to provide unobtrusive devices that are relatively inexpensive, easy to install, easy to replace, quick to maintain, and environmentally safe, while preventing crawling insects from reaching electrical devices mounted above ground.

It is a further object of the invention to provide a mechanical prevention device which may be utilized either as a retrofit on existing structures, or as an integral portion of the manufacturing process of the devices to be protected or the structure supporting or surrounding them.

It is a further object of the invention to utilize a bonding agent to provide an impervious bond between a mechanical prevention device and the support and/or facilitating structures. The purpose of the bonding agent is to seal off any spaces, between the prevention device and the support and/or facilitating structure, which would permit the crawling insect to bypass the device and thereby gain access to the electrical, electromagnetic and/or electronic device mounted above ground. The bonding agent is also utilized to seal the device to poles mounted in the ground where they may be infested by crawling insects.

SUMMARY OF THE INVENTION

These and other objects of the invention are achieved in an assembly positioned along a pathway between ground level and an electrical device. The assembly may be disposed about a pole support or pad support or other facilitating structures. A surface of the assembly provides a pathway leading from the lower part of the support and/or facilitating structure toward the top end of the assembly. A physical obstacle wall extends downwardly from the top end of the assembly and cooperates with the surface pathway to provide a multiple -tactic, stereokinetic, elevation topographic, electrical impulse sensing, heat sensing, olfactory sensing and ultraviolet light barrier. In one embodiment, a plate member extends outwardly from the bottom end of the assembly and cooperates to provide the barrier.

In another embodiment, a bonding agent formed of a plastic polymer seals the assembly to its associated support structure.

In another embodiment, a boot structure is used with the assembly to prevent crawling insects from infesting the interior section of poles mounted in the ground.

DETAILED DESCRIPTION OF THE PREFERRED EMBODIMENT

Figure 1:
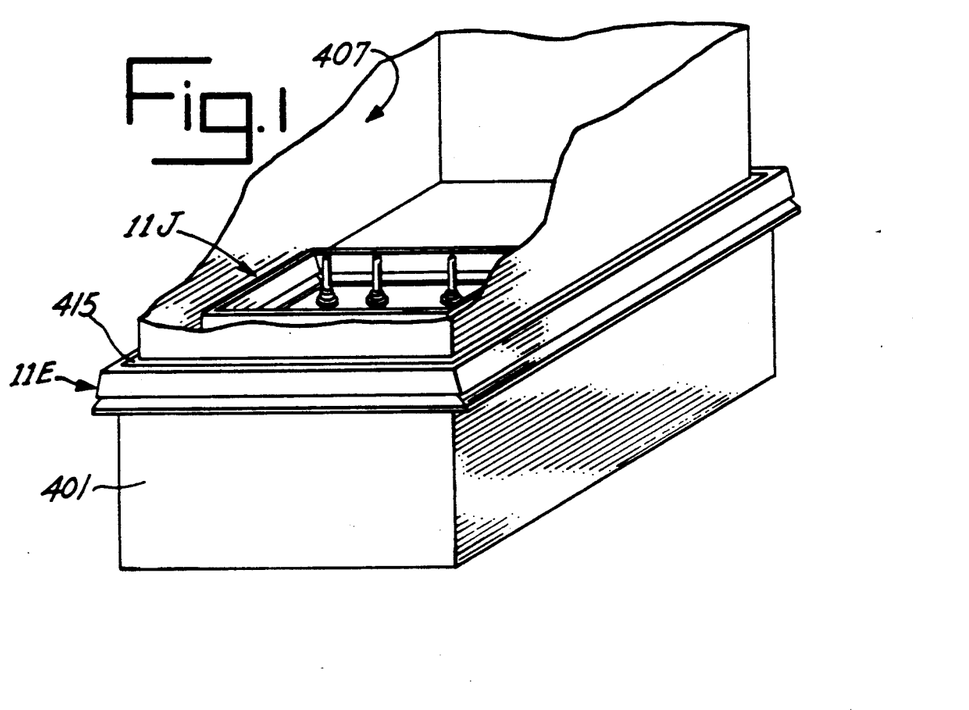
FIG. 1 is an isometric view of a high profile pad for mounting an electrical device.
Figure 2:
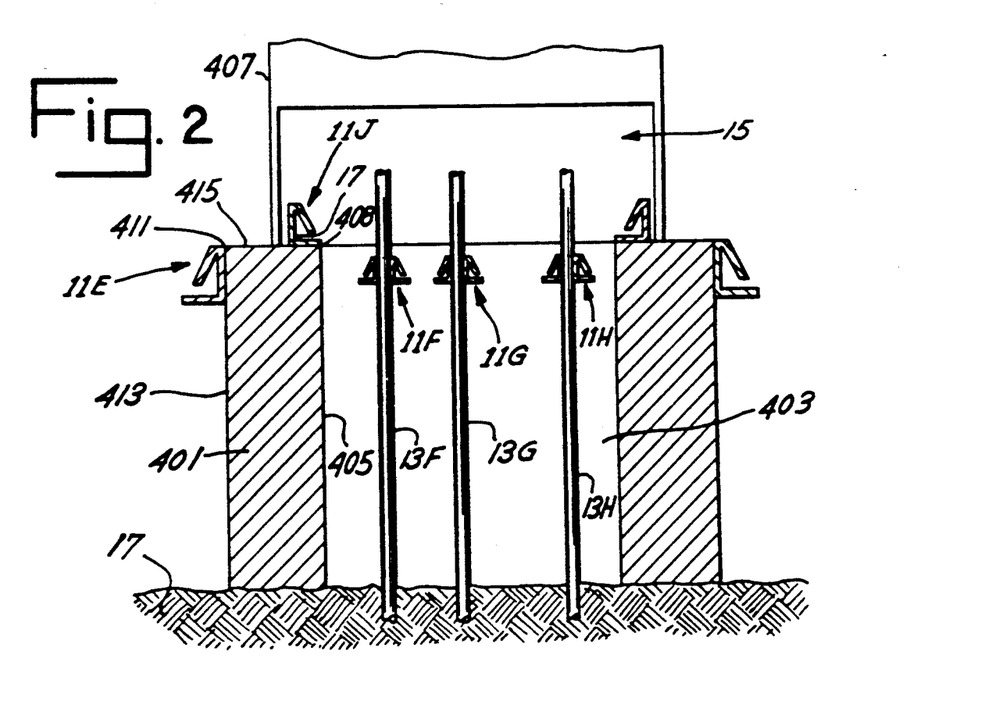
FIG. 2 is a cross sectional side view of the high profile pad of FIG. 1.

Referring to FIGS. 1 and 2, a high profile pad 401 rests on ground 17 and serves as a support for mounting one or more electrical, electromagnetic or electronic devices (not shown in FIG. 1). A device cover 407 rests on pad 401 and covers the electrical device. Pad 401 may be constructed of concrete, plastic or any other impervious material.

Typically, pad mounts have an interior opening 403 through which extend electrical conduit and/or electrical cabling. Conduit or cabling 13F, 13G, 13H are shown in FIG. 2, and serve to conduct electricity in or out of the electrical device 15. Conduit or grounding wires are connected to the electrical device and may exit or enter the pad along the poles or elsewhere. Insect preclusion devices or pest preventers 11E, 11F, 11G, 11H, and 11J are mounted on the pad and electrical cabling for preventing insects or others pests from reaching the electrical device.

Figure 3:
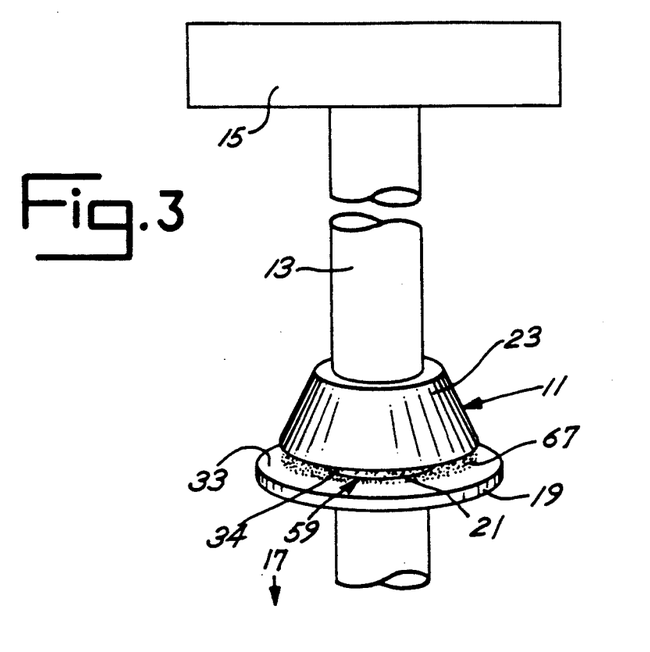
FIG. 3 is an isometric view of a pole mount embodiment of a pest preventer.

As shown in FIG. 3, an insect or pest preventer 11 is positioned along a pole 13 which supports an electrical fixture or other electronic device 15 above a ground level 17 located below the preventer 11. Alternatively, device 15 may be of another type of attraction to crawling insects, analogous to a food source, which is to be protected. Preventer 11 prevents crawling pests from traveling up pole 13, beneath or around the preventer, and entering the electronic device 15.

Preventer 11 is formed from an annular disc member 19, a cylindrical central member 21 and a frustumconical member 23. The three members 19, 21, 23 may be molded integrally to form a single piece or of separate components. The single unit 11 may be slid over pole 13, or alternatively, unit 11 may be formed in pieces which are assembled around pole 13.

Figure 4:
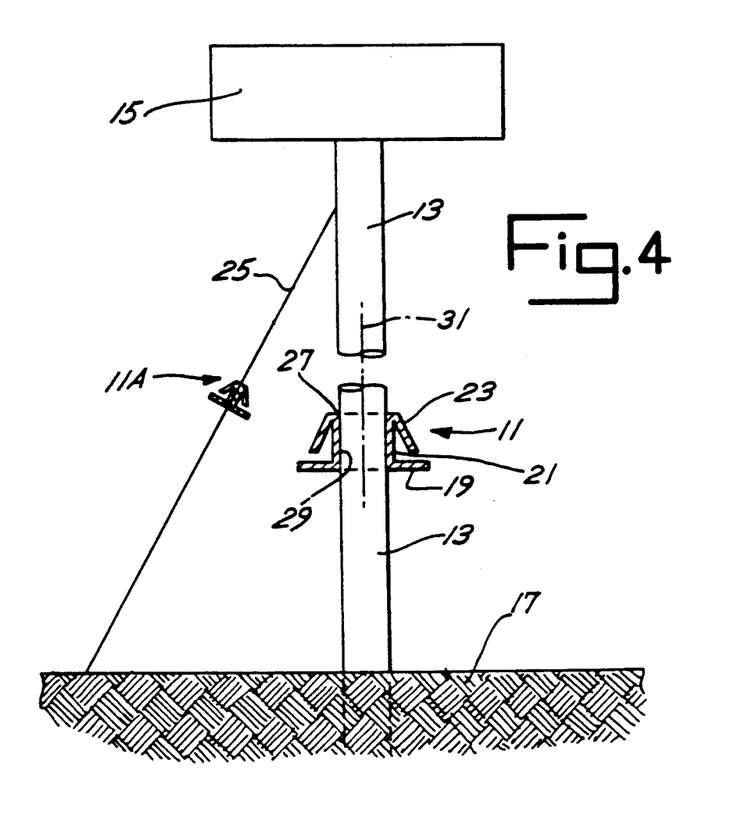
FIG. 4 is a cross sectional view of the pole mount embodiment of FIG. 3 and a cross sectional view of a guy wire/cable mount embodiment of a pest preventer.

As shown in FIG. 4, preventer 11 is positioned above ground level 17 and below the electronic device 15. As also shown in FIG. 4, preventer 11 may be sized in shape according to the supporting structure to which the preventer is attached. A second preventer 11A is shown located along a thin guy wire 25 which connects pole 13 to ground 17.

The central cylindrical member 21 of preventer 11 includes a central cylindrical bore 27 which passes through the central region of the preventer providing an inner cylindrical surface 29 for receiving pole 13 in a close fit tolerance. The close fit is preferably of a sufficient tolerance to prevent crawling pests from crawling between surface 29 and pole 13.

In addition, a bonding agent is placed at the interface between the inner cylindrical surface 29 of preventer 11 and the pole 13 for providing an impervious and inert bond between preventer 11 and pole 13 as well as preventer 11A and guy wire 25. The bonding agent may be a elastomeric that has flexibility, as for example, RTV Silicone sold by 3M Company. The bond seals off any spaces between the preventer and the pole which would permit a small crawling insect to bypass the preventer to gain access to the electrical device 15. The bonding agent is put around the entire top surface of the preventer where it meets pole 13. The bonding agent is designed to keep moisture out as well.

As shown in FIG. 4, preventer 11 is symmetrical in shape, having a rotational axis of symmetry 31. Preventer 11 may be secured in place along pole 13 by any type of securing device including frictional fit, glue or other adhesive, etc.

Figure 5:
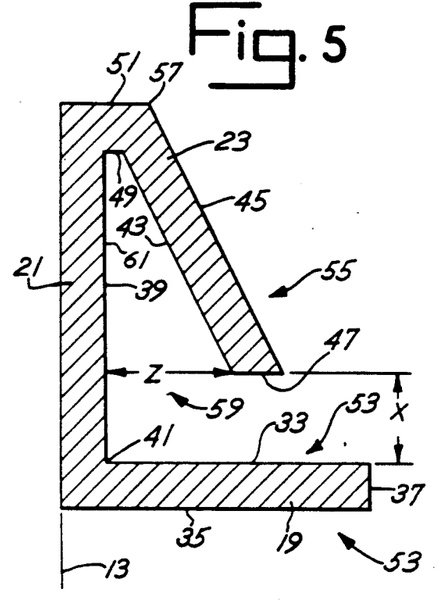
FIG. 5 is an enlarged cross sectional partial view of an embodiment of a pest preventer.

Referring to FIG. 5, disc member 19 includes an upper surface 33 and a lower surface 35. Surfaces 33, 35 are flat surfaces extending generally orthogonally with respect to pole 13 or guy wire 25. An outer edge surface 37 connects upper and lower surfaces 33, 35.

Cylindrical member 21 includes an outer cylindrical surface 39 which meets with upper surface 33 of disc member 19 along line 41. Frustumconical member 23 includes an inner surface 43 and an outer surface 45 which are connected by an edge surface 47. In addition, an annular surface 49 of the frustumconical member connects its inner surface 43 with cylindrical surface 39. Cylindrical surface 39 interconnects the upper surface 33 of disc member 19 with the surfaces 49, 43 of frustumconical member 23.

Disc member 19, cylindrical member 21 and frustumconical member 23 may be integrally formed as a single unit or as separate components. A top surface 51 is formed at the top of preventer 11 and 11A and is connected to the outer surface 45 of frustumconical member 23. The disc member 19 has an outside diameter which may be either equal to or greater than the outer diameter of frustumconical member 23.

The three surfaces of disc member 19, i.e. lower surface 35, edge surface 37 and upper surface 33 together with cylindrical surface 39 provide a first pathway 53 for a crawling insect or pest to take in its attempt to reach electronic device 15 while traveling along pole 13. First pathway 53 must be traversed by the pest if the pest is to crawl from the portion of pole 13 beneath the preventer to the portion of pole above the preventer.

First pathway 53 leads to a second pathway 55 formed by the surfaces 49,43,47,45 of frustumconical member 23. These two pathways 53, 55 connect in tandem and form a pathway which must be used by the pest to reach the top of preventer 11 or 11A. The top surface 51 of the preventer defines the sole entry location of a crawling pest onto pole 13 above preventer 11 or onto guy wire 25 above preventer 11A. Surface 51 is a flat annular surface extending orthogonal with respect to the axis of bore 27 of cylindrical member 21.

Frustumconical member 23 serves as an obstacle wall which extends outwardly from cylindrical surface 39. The lower edge 47 of wall 23 is spaced above the upper surface 33 of disc member 19 by a distance "X." "X" must be of a sufficient height to prevent the insect or pest from reaching wall 23 directly from upper surface 33 of disc member 19.

For example, various types of insects account for a large majority of electrical, electromagnetic and/or electronic device infestations. If the largest of the insects are approximately one-half of an inch in length, then the height of the outer edge of obstacle wall 23 should be established at approximately ¾ inches above the first pathway, i.e., a height such that the insect cannot pull itself up onto obstacle wall 23. Where larger or smaller insects are to be expected in the particular environment, or where the angle of installation is other than horizontal, or where varying amounts and types of foreign material are to be excluded, the height of the bottom edge 47 of wall 23 above the first pathway, i.e., "X", may be adjusted upwardly or downwardly accordingly.

Outer obstacle wall 23 is a single-thickness member, frustumconical in shape, which is secured along the entire extent of the outer circular edge 57 of top surface 51. Inner surface 43 of obstacle wall 23 confronts the outer cylindrical surface 39 of cylindrical member 21. Obstacle wall 23 is angled outwardly with respect to cylindrical member 21 for providing a more open area between the lower portions; as compared to the upper portions, of the obstacle wall and the cylindrical wall, as shown.

Figure 6:
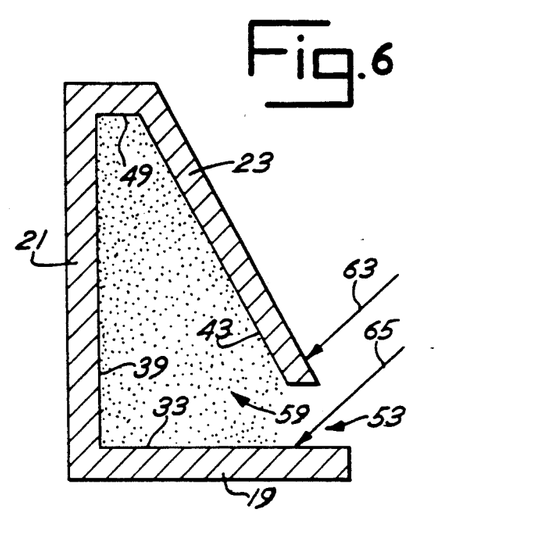
FIG. 6 is an enlarged cross sectional partial view of an embodiment of a pest preventer illustrating interference with light rays.

As shown in FIG. 6, obstacle wall 23 cooperates with cylindrical member 21 to form a partially enclosed area or "light" barrier 59 which prevents ants or crawling insects from reaching top surface 51 of the preventer. In order to reach the top surface 51, the insect must pass into barrier area 59 since the distance "X" is of a sufficient height to prevent the insect from physically reaching up to outer obstacle wall 23.

The spacing between inside surface 43 of obstacle wall 23 and cylindrical surface 39 must not be too small. As shown in FIG. 5, surface 43 is spaced from surface 39 by a maximum distance "Z." Distance "Z" must be as large or larger than distance "X" so that the insect will be required to travel between the two surfaces 39, 43 as it makes its upward climb along cylindrical surface 39.

As the insect reaches point 61 on cylindrical surface 39, it is at a point approximately "X" distance from obstacle wall 23. The insect must travel at least between disc member 19 and point 61 before it can reach over to surface 43 of obstacle wall 23. This distance from disc member 19 to point 61 must be sufficient to draw the insect into the barrier area between walls 21, 23 so that: (1) the insect's -tactic responses will be confused, (2) the insect's elevation topographic sensing capabilities become disoriented, (3) the insect's electrical impulse sensing (seeking) capabilities become less effective, (4) the insects heat sensing (seeking) abilities will become less effective, (4) the insect's olfactory senses are not as strongly stimulated and will become confused and (5) the intensity of the ultraviolet light is insufficient for navigation and orientation purposes. For example, with a distance X equal to ⅞ inches, point 61 should be approximately 1¼ inches from surface 33 if the device is installed in the horizontal position (with surface 33 parallel to the horizontal). However, this distance will vary with the angle of the installation with respect to the horizon.

In use, the insect preventer 11 is placed surrounding pole 13 by either slipping the preventer over the pole or assembling components of the preventer around the pole if the preventer has a provision therefore. The outer obstacle wall 23 is elevated above the upper surface 33 of disc member 19 to the height specified as "X" in FIG. 5. This elevation: (1) creates a mechanical barrier or maze which disturbs or disorients the insect's foraging activity; (2) increases the insect's Area Restricted Search (ARS) time making homing orientation more time consuming for a forager that may have reached the electrical device 15; (3) disrupts communication among insects during the organization phase of cooperative search and foraging; (4) creates an open space ("X") that (a) exceeds the combined body and foreleg length of the insects, which precludes the insects from "pulling themselves up" onto wall 23, and (b) prevents the insects from building a structure to circumvent the devices; (5) disrupts the trail pheromones of insects that have reached the electrical device 15, and may have "jumped" from obstacle wall 23 to surface 33; and (6) attenuates the ultraviolet light used for navigation and orientation by insects.

Crawling insects search for food, shelter or other desired objectives in several modes: Area Restricted Search, olfaction, heat sensing (seeking) capabilities, electrical impulse sensing (seeking) capabilities, trail pheromones, visual cues, and numerous sensorial modalities. Insects initially locate food or other goal alternatives by some combination of an Area Restricted Search, vision, odor, heat sensing, and/or electrical sensing modes in combination with a highly developed internal topographic map developed using multiple sensorial modalities and polarized or unpolarized ultraviolet light from natural or artificial sources. Once the food or other desired objectives are discovered, a trail pheromone is usually deposited by the successful forager as it returns home (nest); and some portion of the colony follows the trail pheromone to the food or other objectives. The mechanical barriers of the preferred embodiments disrupt and/or disorient the insect's foraging activities.

The mechanical barrier disrupts or disorients foraging activity in a multiplicity of ways. Insects (ants) have -tactic responses. A taxis is a reflex or orientation movement by insects (ants) in relation to a source of stimulation. Example taxes are Photo (light), Thigmo (contact, especially with a solid object), GEO (gravity), etc. Taxes may be used individually (one at a time), concurrently (more than one at a time), serially (one after another); and most taxes may be either positive or negative. Insects (ants) may switch taxes rapidly; and they may switch from positive to negative, or vice versa rapidly. The use of taxes by insects may vary with either or both the environmental states and/or current states of the insect (ant).

As shown in FIG. 6, obstacle wall 23 shades the cylindrical surface 39 and a portion of the upper surface 33 from light rays, as represented by light rays 63, 65. As shown in FIG. 3, a shadow 67 appears on upper surface 33 of disc member 19 beneath obstacle wall 23. The intensity of light within the barrier area 59 is typically lower than the intensity of light outside the barrier due to the shading of light by wall 23 (See FIG. 6).

If the insect is currently utilizing only its positive phototactic response mode (that is, it prefers to move toward light rather than away from light), the shadow deters the insect from entering barrier area 59 between the obstacle wall and the cylindrical wall. As the insect begins to climb the cylindrical surface 39 along first pathway 53 entering the barrier area 59, the insect approaches a progressively darker area within barrier area 59. The insect's response tendency is to make a positive phototactic choice and exit barrier area 59 back along the cylindrical surface 39 toward light.

If the insect does not retreat back down cylindrical surface 39, the insect will climb the cylindrical surface 39 towards the inner surface 49. When the insect reaches the inner surface 49, it places itself in a position where all choices of further movement are positively phototactic. If an insect is in either a negative phototactic response mode or alternating between positive and negative phototactic response modes, barrier area 59 would disorient or disrupt foraging activity. If the insect is concurrently or serially utilizing other -tactic response modes, the disorientation/disruption would become more severe. For example, if the source it was seeking was initially located through olfactory senses, the insect would utilize, among other, the geotactic response mode to establish an elevation topographic reference point. If the insect was concurrently operating in a negative thigmotactic response mode, it would not climb surface 39 when it was encountered. If it switched to a positive thigmotactic response mode, it would climb surface 39. As it climbed surface 39, the olfactory responses would diminish as it entered barrier area 59. Since it was previously operating either concurrently or serially in a geotactic response mode, it would receive conflicting stimuli. That is, the olfactory modality indicated the presence of a food supply or other attractant. As the insect climbed surface 39 to approach the area which the olfactory senses identified, the geotactic response mode would provide positive reinforcement, while the olfactory modality would provide negative reinforcement. The result would be disorientation of the insect. The insect would then switch among -tactic responses to provide clarification. For example, it could switch to positive and/or negative phototactic response modes. If it were positive and switched to a negative phototactic response, it would again become disoriented when it reached inner surface 49 when all choices of movement would be phototactically positive. If it switched to a positive phototactic response mode at that point, both choices would be equally acceptable. Since it had not discovered the food source or other attractant at the apex of its geotactic response, it would most likely return from its original direction back down surface 39. Barrier area 59 effectively serves to disorient the insect's combined sensorial modalities and -tactic responses. The claims made for the insects olfactory responses are made in a like manner for the insect's heat seeking and electrical impulse seeking responses.

Insects utilize the polarized ultraviolet portion of the light spectrum to provide navigation and orientation with respect to food, water, and other items of importance. Ultraviolet light sources may be natural or artificial and are used by insects twenty-four hours a day in any type of weather. Barrier area 59 attenuates the intensity of the ultraviolet spectrum by absorption, reflection, and light scattering.

Figure 7:
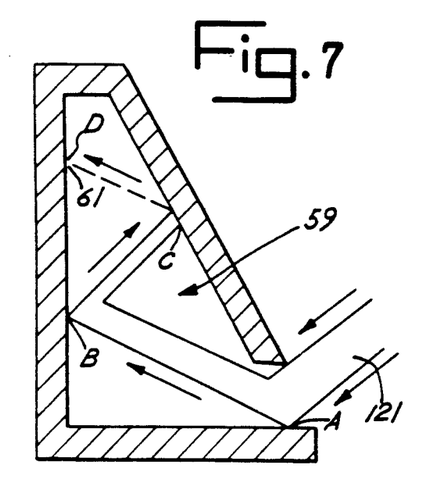
FIG. 7 is a cross sectional partial view of the pest preventer of FIG. 6 illustrating interference with ultraviolet light rays.

As shown in FIG. 7, a light ray 121, representative of ultraviolet light of a certain intensity, radiates as shown by arrows into the barrier area 59. The intensity of ray 121 is represented by its thickness. At points A,B,C, and D, the intensity of the ultraviolet light ray 121 is attenuated due to (1) absorption, (2) light scattering, and (3) reflection. Point D is the point of location of point 61 of FIG. 5.

The ultraviolet spectrum loses its ability to provide navigation and orientation cues when it drops below a specified intensity level. Barrier 59 effectively attenuates the ultraviolet light so that insects become disoriented. When the disorientation occurs, the insect attempts to remove itself from barrier 59 in order to regain the ultraviolet navigation and orientation spectrum. The point at which the insect loses its ability to navigate by ultraviolet light is variable depending on: (1) the intensity of the ultraviolet source (e.g. sun's ultraviolet is more intense than moon's ultraviolet source) (2) the color and composition of pathway 53, (3) the coarseness or smoothness of pathway 53, and (4) the color, composition, and material of the preventer. Each of these four factors affect the degree of absorption, reflection, and light scattering of ultraviolet light. Therefore, point 61 (FIG. 5) should be located at a point where the ultraviolet light has attenuated to a level sufficient to confuse the insect's navigation.

Stereokenisis is an undirected movement which occurs when an insect encounters an orthogonal surface such as outer cylindrical surface 39 of cylindrical member 21. Specifically, the response mode of the insect, when it encounters a vertical surface which is orthogonal to its direction of movement, is that it chooses to follow around the surface rather than climb the route of the vertical surface. The stereokinetic effect in conjunction with the disruption of the -tactic response modes and the disruption and attenuation of the ultraviolet light sources used for navigation produces disorientation in the insect.

The preceding illustration may be expanded to the extent of the statistical permutations of the combined sensorial modalities, -tactic responses and stereokinetic movements of the insect and the degree of the ultraviolet light attenuation used by the insect to navigate and orient itself.

A search mode utilized by insects (ants) is Area Restricted Search (ARS). Several methods of foraging activity exist within ARS; however, the design of the embodiment has the same effect on all forms of ARS. The effect is that it increases search time through the use of surfaces 35, 37, 33, 39, 49, 43, 47, 45 and surface 51 as opposed to a single exterior surface. The distance traveled in foraging activity is thus further. The increased ARS time makes homing orientation for the insect (ant) more time consuming, which puts it at a comparative time disadvantage with competing foragers.

In addition to the ARS time disadvantages created by the embodiment, a forager that does discover a food source or other objective has a second disadvantage. When an objective source is discovered, the insect (ant) begins deposition of a trail pheromone, which is volatile. Trail pheromones are specific scents insects use as a communication method to indicate the presence of a food source or other objective to the colony, which subsequently follows the trail pheromone. Because of the increased time required for homing due to surfaces 35, 37, 33, 39, 49, 43, 47, 45 and 51, the volatile characteristic of the deposited trail pheromones will produce three effects: a weaker odor (trail pheromone) signifying an unimportant food source or other objective; no odor (pheromone) indicating no objective; and/or a trail pheromone that, when compared with the trail pheromones of other foragers which have discovered an objective at approximately the same time, is comparatively uninteresting with respect to locating an objective. Disruption of the communication process described above during the organization phase of cooperative foraging is known to be very dysfunctional to successfully utilizing a food or other objective sources. The organization phase refers to the recruiting of harvesters by the foragers.

FIG. 5 indicates the variable distance "X" above surface 33 or pathway 53. This distance prevents crawling insects from "pulling themselves up" onto outer surface 45. The distance must be greater than the combined length of both the forelegs and the body length (from the tip of the mandibles to the tip of the gaster) of the insect (ant).

Insects (ants) may reach the top surface 51 either by having a size exceeding the distance "X" or by successfully traversing surfaces 39,43,47,45,51. If protectable area 15 is reached, the insect (ant) may begin to deposit a trail pheromone on surface 45 of outer obstacle wall 23 as it leaves the protectable area. When the insect reaches the bottom of obstacle wall 23 (FIG. 5), it may elect to "jump" to surface 33. In that event, the trail pheromone will not be continuous. The forager will return to home and a portion of the colony will follow the trail pheromone to the point of discontinuity. The insect's (ant's) access to the food source or other objective source will be precluded because a continuous trail pheromone does not exist.

Since insects may use air-borne scents to discover food or other objective sources, once the insect is within barrier area 59 between the obstacle wall and cylindrical wall, scent from the food or other objective source no longer provides direction. The scent would appear to the insect to be coming from the plate member 19 or ground. The scent travels around obstacle wall 23 and enters the barrier area from the level of disc member 19. This directs the insect to return to the start of pathway 53, to exit barrier area 59, rather than continuing the search within the barrier area.

To provide a further barrier, if desired, insect poison or repellant may be placed on either or both of the inside surfaces 39, 43 of the barrier area. The poison and/or repellant may be of several types: spray, liquid, gel, or adhesive.

Figure 8:
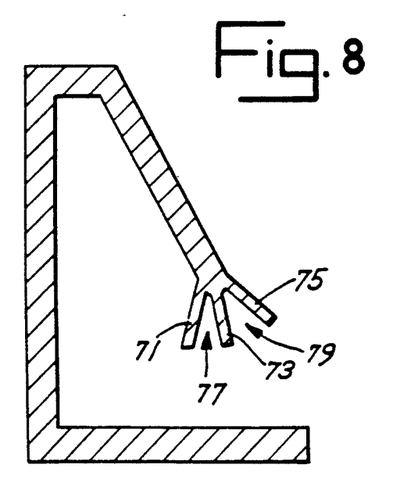
FIG. 8 is a cross sectional partial view of a pest preventer having multiple physical obstacles.

Referring to FIG. 8, another embodiment is illustrated in which additional physical obstacles 71,73,75 may be secured to the obstacle wall 23. The additional obstacles 71,73,75 provide additional barrier areas 77,79 for providing additional phototactic, heat sensing, electrical impulse sensing and scent barriers operating in a similar fashion as barrier area 59.

Figure 9:
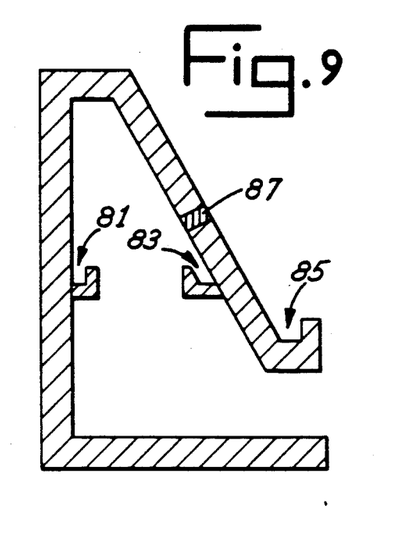
FIG. 9 is a cross sectional partial view of a pest preventer illustrating interior and exterior moats.

Referring to FIG. 9, another embodiment is illustrated in which moats 81,83, and 85 may be constructed along the cylindrical wall and obstacle wall as shown. The moats may be filled with any form of liquid, spray, or gel insecticide. An exterior port 87 may be utilized to fill moats 81,83.

Figure 10:
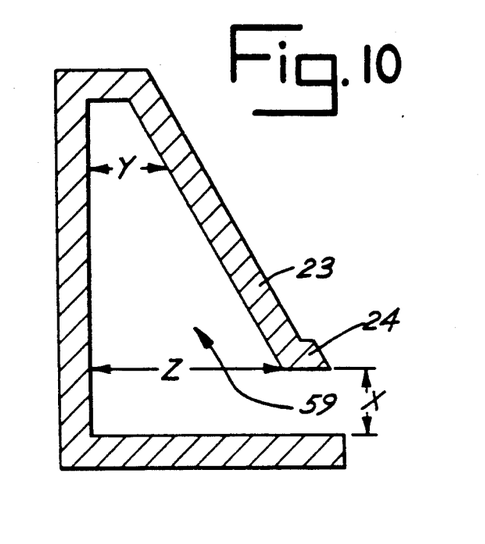
FIG. 10 is a cross sectional partial view of a pest preventer.
Figure 11:
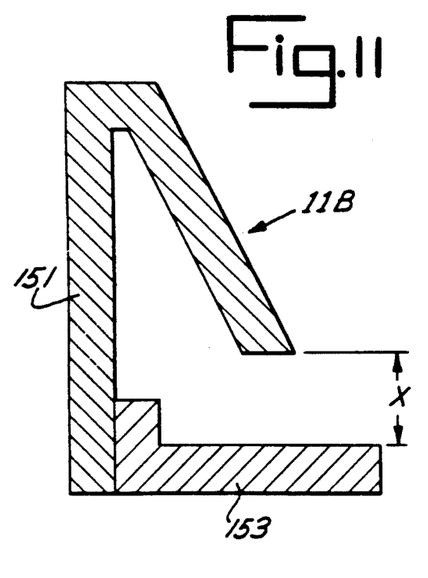
FIG. 11 is a cross sectional partial view of a pest preventer illustrating alternate methods of construction.
Figure 12:
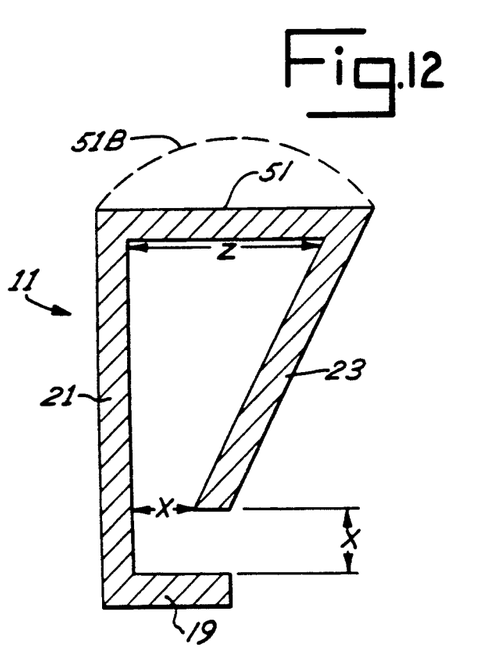
FIG. 12 is a cross sectional partial view of a pest preventer illustrating a structure to retard the deposit of foreign materials onto the preventer.

As shown in FIGS. 10, 11, and 12, additional embodiments of preventer 11 are illustrated. In FIG. 10, outer obstacle wall 23 includes a thickened end 24 for making the device more durable. In FIG. 11, preventer 11B is formed of two pieces 151, 153; piece 153 may be friction mounted, adhesive mounted, slot mounted, etc. to piece 151. In FIG. 12, the preventer is shaped such that obstacle wall 23 extends downwardly and inwardly toward wall 21. Barrier 59 operates in the previously described manner, however, the horizontal distance "X" occurs at the lowest point of obstacle wall 23. Upper surface 51 may also be constructed in a non-linear method as illustrated by the dotted line 51B. Preventer 11 of FIG. 12 is useful if the devices ar to be installed in positions or locales in which there is a likelihood that foreign objects (such as leaves, weeks, grass, pine needles, etc.) may lodge between any portion of member 19 and obstacle wall 23. The deposit of such foreign objects, as stated, would provide a "bridge" which would allow crawling insects to by-pass barrier 59 and thereby gain access to electrical device 15. The maximum distance "Z" will determine the length which the upper portion of the device is elongated. The purpose of the modification is to increase the difficulty with which the effectiveness of the device may be reduced by fallen or wind blown foreign objects.

A plurality of insect preclusion devices 11 may be installed in series in order to reduce the probability of insect incursion into devices 15. That is the crawling insects would be required to circumnavigate more than one device of the same type mounted on a specific installation. For example, two or more devices 11A may be mounted on one guy wire 25.

Figure 13:
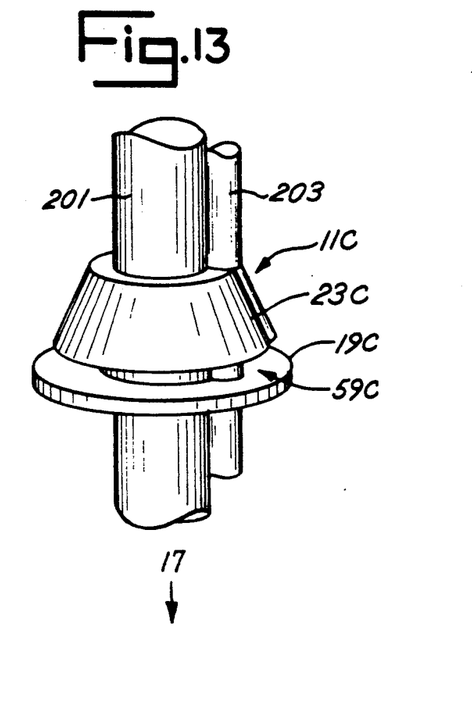
FIG. 13 is an isometric view of a pole mount embodiment of a pest preventer.

As shown in FIG. 13, a cable or conduit 203 runs along a pole 201 and both are surrounded by a preventer 11C. Disc member 19C is fashioned so as to receive both pole 201 and cable or conduit 203. In addition, frustumconical member 23C is fashioned to surround both pole and cable to provide a sufficient barrier area 59C of the type described above.

Figure 14:
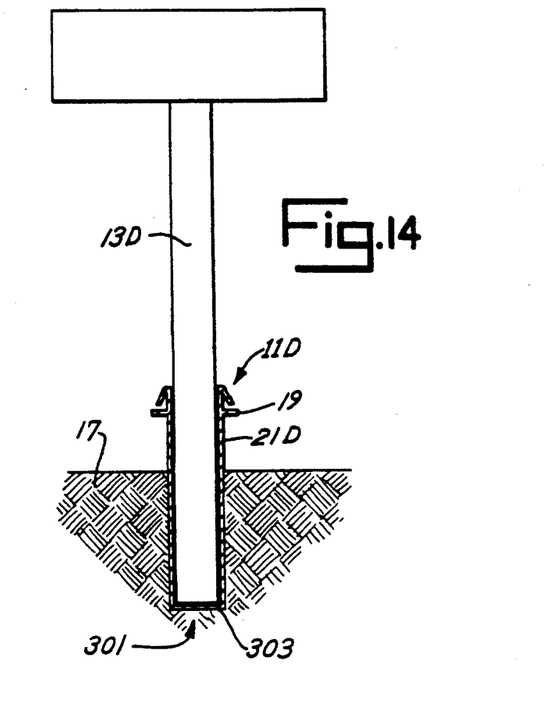
FIG. 14 is a cross sectional side view of a pole mount embodiment of a pest preventer having a crawling insect preclusion boot.

As shown in FIG. 14, preventer 11D has its cylindrical member 21D extending below disc member 19 to form a boot 301 for receiving pole 13D. Boot 301 includes a bottom cap 303 such that an insect cannot reach pole 13D from below ground level. The boot and pole are embedded in ground 17 so as to locate disc member 19 above ground 17, as shown. The boot 301 prevents insects from attacking or infesting the pole 13D which may be formed of wood.

Referring again to FIG. 2, preventer 11E circumscribes a high profile pad 401 which rests upon the ground 17. Pad 401 may be cylindrical in shape, similar to pole 13, or may be rectangular or take on other forms. As shown in FIG. 1, pad 401 is rectangular. In addition, pad 401 may be a low profile pad which is shorter to the ground.

As shown in FIG. 2, pad 401 includes a hollow center section 403 through which multiple cables or conduits 13F, 13G, 13H, etc. extend. In addition, preventers 11F, 11G, 11H, etc. are positioned on cables or conduits 13F–H, as shown.

In order to prevent pests from crawling up inside the wall surface 405 of the pad and reaching device cover 407 or device 15 (not shown in FIG. 1), a preventer 11J circumscribes the top edge of inside wall surface 405. The top edge may be rectangular in shape as shown in FIG. 1. Preventer 11J prevents the pests from reaching device cover 407 or device 15 even though preventer 11J may not be in contact with device cover 407.

Figure 15:
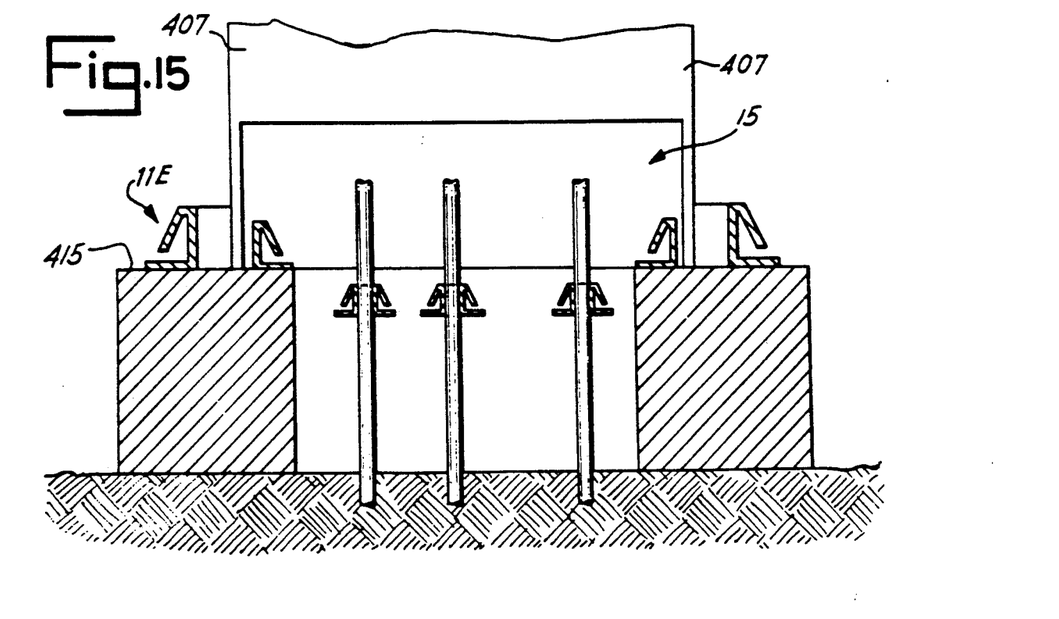
FIG. 15 is a cross sectional view of a low profile pad embodiment.

The preventer 11E is positioned at the top edge 411 of outside wall surface 413 of the pad. This prevents pests from reaching the device cover 407 or device 15. Because pad 401 is a high profile pad, it has a height such that foreign materials are unlikely to lodge against the preventer. Alternatively, with a low profile pad, preventer 11E is located to rest on the top surface 415 of the pad as shown in FIG. 15. As shown in FIG. 15, the preventer 11E is set back from the perimeter to reduce the chances that foreign materials will lodge against the preventer. Preventer 11E of FIG. 15 need not be in contact with device cover 407.

Figure 16:
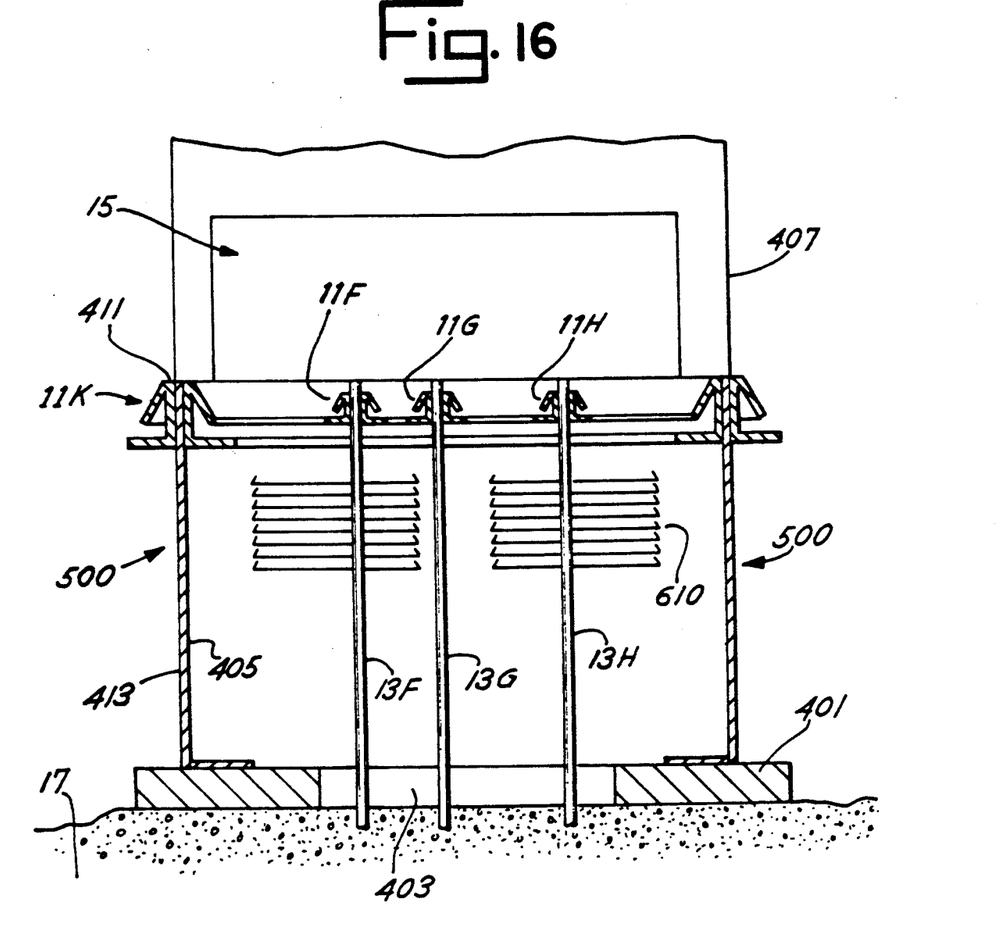
FIG. 16 is a cross-sectional view of a generally rectangular support vehicle embodiment with a single electric device mounted on the vehicle.

Referring to FIG. 16, a preventer 11K circumscribes the upper perimeter of a generally rectangular support vehicle 500 which rests on either ground 17 or pad 401. Pad 401 includes a hollow center section 403 through which multiple cables or conduits 13F, 13G, 13H, etc. extend. Preventers 11F, 11G, 11H, etc. are positioned on cables or conduit 13F, 13G, 13H, etc. as shown in FIG. 16. These preventers keep crawling insects from climbing the cables or conduit in order to reach device 15.

In order to prevent crawling insects from reaching device 15 by climbing the interior wall 405 or exterior wall 413 of support vehicle 500, preventer 11K is positioned at the top edge 411 of support vehicle 500. Preventer 11K is constructed in such a manner that support vehicle 500 has a continuous preventer around the entirety of top edge 411. The device 15 is supported above ground and attached to support vehicle 500. Device 15 is covered with device cover 407. Louvers 610 are provided on support vehicle 500 to allow heat generated by device 15 to exit the interior area.

Figure 17:
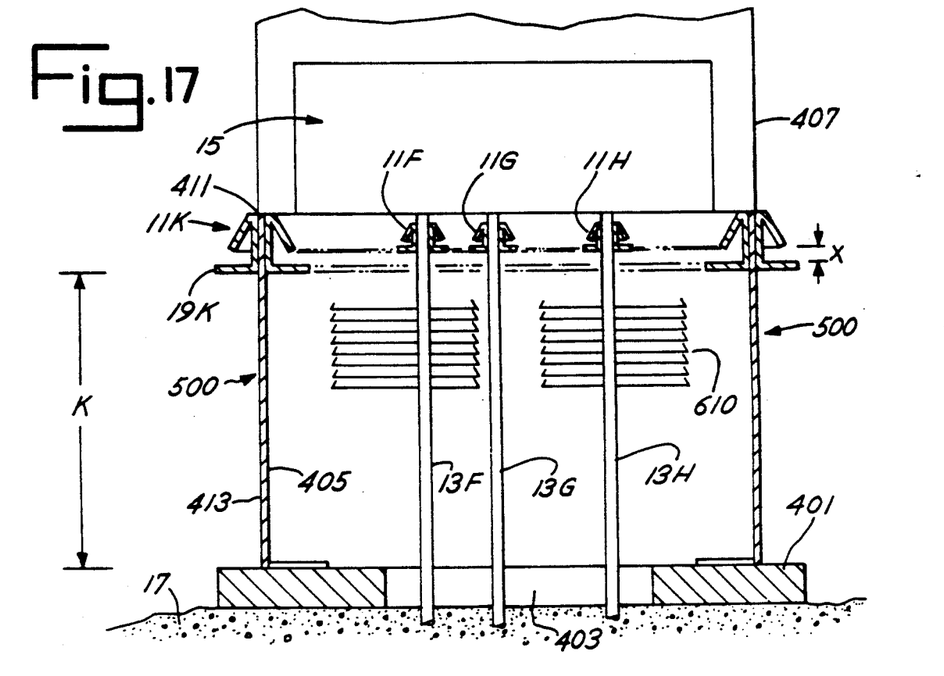
FIG. 17 is a cross-sectional view of the generally rectangular support vehicle and electric device of FIG. 16 illustrating the support vehicle's variable height.

The height of support vehicle 500 is variable depending on the type of device 15 to be protected, the type and size of pests to be precluded from device 15, and the physical environment (e.g., a jungle or a manicured lawn). As shown in FIG. 17, a variable distance K is used to vary the elevation of projecting member 19L of preventer 11K from either ground 17 or pad 401. The height of wall surfaces 413, 405 above ground 17 or pad 401 varies in accordance with the selected distance K. The purpose of having a variable elevation for 19K is that device 500 may then be utilized in a variety of environmental conditions as well as in precluding different types and sizes of crawling insects, mammals, snails, snakes, or other pests. For example, any wind blown debris that is blown against device 11K may permit insects to circumvent the preclusion device by crawling on the debris to reach the electrical equipment. Raising projecting member 19K by the distance K will serve to prevent such an event. The higher projecting member 19K is from ground 17 or pad 401, the less likely it is that wind blown debris, tall grass, weeds, sticks, or other environmental objects will permit device 11K to be circumvented.

However, other practical and aesthetic considerations may tend to limit the height K. Therefore, K should be determined at a height that is consistent with (a) precluding crawling insects, snakes, mammals, snails, and other pests, (b) having a pleasing aesthetic appearance, and (c) otherwise being practical or useable.

The same reasoning applies with respect to different types and sizes of crawling insects, mammals, snails, snakes, and other pests to be prevented from entering the electrical device. For example, the Imported Fire Ant is capable of building mounds to reach an objective. The variable distance K may be defined in such a manner as to prevent the Imported Fire Ant from building a mound to circumvent device 11K in order to reach electrical device 15.

In a similar manner, small mammals, snails, snakes, or other pests may be prevented from reaching electrical device 15 by varying the distance K. For example, mice can jump a specified height. The distance K may be established in such a way as to exceed the mouse's jumping capability. The examples could be expanded to include other specific characteristics of various crawling insects, small animals, snails, snakes, or other pests which would permit them to circumvent 11K with projecting member 19K, or preventers 11F, 11G, or 11H, to reach electrical device 15.

Snakes may be precluded from reaching device 15 or projecting member 19K by: (1) using a smooth surface (such as stainless steel, plastic, or any similar material) for wall surfaces 413 and 405; (2) varying the distance K so that K is equal to or greater than two-thirds of the length of the type of snake to be precluded; and (3) designing rectangular support vehicle 500 so that the perimeter of rectangular support vehicle 500 exceeds the length of the snake to be precluded. Snakes have the capability of extending their bodies vertically from the ground up to a distance equal to approximately two-thirds of their entire length. If the snake, by extending itself vertically, can reach projecting member 11K, it will then lodge its head and neck on these devices or components and pull the rest of its body past walls 413 and 405. Support vehicle 500 must be designed so that K is equal to or greater than two-thirds of the length of the type of snake to be precluded.

The smooth surface previously described prevents the snake from using its scutes to attach itself to walls 413 or 405 for purposes of climbing walls 413, 405. The perimeter of support vehicle 500 must be greater than the length of the snake to be precluded, since snakes may also climb a support vehicle 500 having a perimeter which is less than their body length. The snake accomplishes this purpose by forming a circle around the object to be climbed, such as support vehicle 500, and constricting its body to provide traction through this constriction pressure for climbing the object.

In sum, variation of the distance K may prevent any or all of the aforementioned creatures, except snakes, from reaching electrical devices 15 by elevating projecting member 19K to a predefined height for the specific situation. As noted above, for snakes it is also necessary to: (1) use a smooth surface for walls 413 and 405 of support vehicle 500; (2) vary the distance K so that K is equal to or greater than two-thirds of the length of the type of snake to be precluded; and (3) construct support vehicle 500 so that the perimeter of support vehicle 500 is greater than the length of the snake to be precluded.

The method described above interferes with an insect's navigation and orientation systems in such a manner as to prevent it from reaching a food and water sources, heat sources, electromagnetic field sources, as well as other designated objectives. This same method of preventing insects from reaching any objective source may be used in other forms to prevent insects from reaching other food, water, and objective sources. For example, crawling insects may be excluded from buildings, homes, etc., within which food objective sources may be found.

The insect preclusion devices 11, 11A, 11B, 11C, 11D, 11E, 11F, 11G, 11H, 11J and 11K may be manufactured from a wide range of materials. The materials chosen would reflect the conditions surrounding specific installation and application problems.

The insect preclusion devices 11, 11A, 11B, 11C, 11D, 11E, 11F, 11G, 11H, 11J and 11K may either be manufactured as retrofits for existing installations; as an integral portion of the electrical device (or the electrical device's exterior casing) to be protected, for example the casing surrounding a transformer; or as a part of support vehicle 500.

Figure 18:
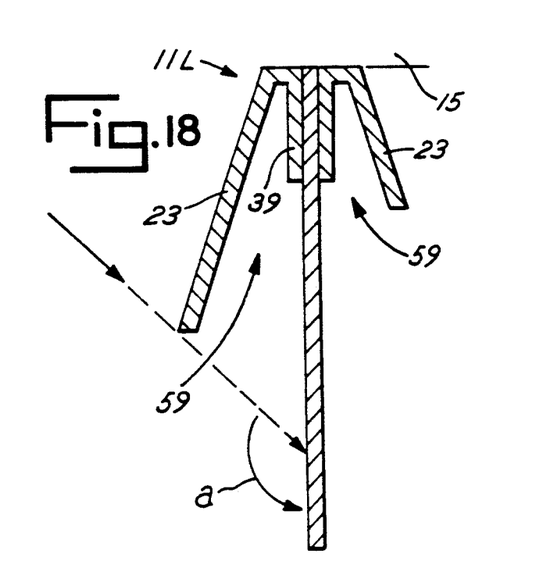
FIG. 18 is a cross-sectional partial schematic view of an embodiment of a pest preventer.

The disc member 19 may be replaced in preventor 11 by extending the length of obstacle wall 23, as shown in FIG. 18, in such a manner as to provide an adequately dense shadow within the barrier area 59. This attenuates ultra-violet light sufficient to disorient the insect and serves to disrupt the insect's phototactic, ultraviolet orientation, and other orientation-navigation systems. The extent to which obstacle wall 23 is lengthened depends upon the amount and the direction of sunlight. For example, where obstacle member 23 is located under device 15, little sunlight may reach barrier area 59. However, where direct or indirect sunlight comes from beneath area 59 then disc member 19 is needed. Thus, in an environment where sunlight emanates from an obtuse angle "a" with respect to the pathway leading onto the inside surface 39, then obstacle member 23 may be extended to shadow the surface 39 and barrier area 59.

The terms "insect" and pest has been used in a broad sense to include small pests of the crawling (land moving) variety which seek to enter, for example, electrical, electromagnetic, and electronic devices as well as a food area or water source. Such pests include gastropods such as snails and slugs.

It is to be understood, of course, that the foregoing describes different embodiments of the present invention and that modifications may be made therein without departing from the spirit or scope of the present invention as set forth in the appended claim.

What is claimed is:

1. A pad support structure for mounting an electrical device and for preventing a crawling pest capable of climbing a gap of a predetermined size from reaching the electrical device without the need for chemical repellants, said structure comprising;
   a pad for resting on the ground;
   a sleeve having an inside surface for receiving the pad in relative close fit tolerance and having an outer surface, said sleeve having a ground side end and an upper end, and said sleeve being disposed above ground on said pad;
   a projecting member secured to the ground side end of said sleeve and extending outwardly from said outer surface of said sleeve, said projecting member having an underside surface and an edge surface and a topside surface, said underside surface, said edge surface and said topside surface and said outer surface forming a first pathway for movement therealong by the crawling pest leading from beneath said projecting member to the upper end of said sleeve;
   an obstacle member secured to the upper end of said sleeve and circumscribing the upper end of said sleeve for blocking movement of a pest along said first pathway, said obstacle member having an inside surface ending in an edge separated from said topside surface by a distance greater than said predetermined size, said inside surface providing a second pathway leading in a direction away from said upper end of said sleeve and away from said first pathway.

2. A pad support structure according to claim 1 wherein said underside surface and said topside surface are orthogonal to said pad.

3. A pad support structure according to claim 1 and further including second obstacle means having a surface depending toward ground and being spaced from said inside surface for forming a second barrier area for providing multiple-tactic and ultraviolet light barriers.

4. A pad support structure according to claim 1 wherein said sleeve, said projecting member and said obstacle member may be either formed integrally formed as one unit or of separate components.

5. A pad support structure according to claim 1, further including a bonding agent for sealing the area between said sleeve and the pad.

6. A pest preventer, for location on a pole or guy wire which is disposed between ground and a protectable area, and which prevents a crawling pest capable of climbing a gap of a predetermined size from reaching the protectable area via the pole or guy wire without the need for chemical repellants, said preventer comprising;
   a sleeve having an inside cylindrical surface for receiving a pole in relative close fit tolerance and having an outer surface, said sleeve having a ground side end and an upper end,
   a projecting member extending outwardly from said outer surface of said sleeve, said projecting member having an underside surface and an edge surface and a topside surface, said underside surface, said edge surface, said topside surface and said outside surface forming a first pathway for movement therealong by the crawling pest leading from beneath said projecting member to the upper end of said sleeve;
   an obstacle member secured to said sleeve above said projecting member and circumscribing said sleeve for blocking movement of a pest along said first pathway, said obstacle member having an inside surface ending in an edge separated from said topside surface by a distance greater than said predetermined size, said inside surface providing a second pathway leading in a direction away from said upper end of said sleeve and away from said first pathway.

7. A pest preventer according to claim 6 wherein said obstacle member includes a frustumconical member depending from said upper end of said sleeve toward ground with increasing diameter, at least a portion of the extent of said obstacle means having a diameter greater than said predetermined size.

8. A pest preventer according to claim 6 wherein said inside surface is frustumconical in shape.

9. A pest preventer according to claim 6 and further including second obstacle means having a surface depending toward ground and being spaced from said inside surface for forming a second barrier area for providing multiple-tactic and ultraviolet light barriers.

10. A pest preventer according to claim 7 wherein said projecting member is secured to the ground side end of said sleeve.

11. A pest preventer according to claim 6 wherein said sleeve includes a bottom cap member.

12. A pest preventer according to claim 6 wherein said obstacle member is secured to the upper end of said sleeve.

13. A pest preventer according to claim 6 wherein said sleeve, said projecting member and said obstacle member may be either formed integrally formed as one unit or of separate components.

14. A pest preventer according to claim 6 and further including a bonding agent means for sealing the area between said pest preventer and the pole or guy wire.

15. The pest preventer of claim 6, wherein the edge surface of said projecting member extends at least as far radially outward as the edge of the inside surface of said obstacle member, each with respect to the outer surface of said sleeve.

16. The pest preventer of claim 6, wherein said topside surface is planar.

17. The pest preventer of claim 6, wherein said topside surface is free of liquid chemicals.

18. A pest preventer according to claim 6, wherein said underside surface and said topside surface are orthogonal to the pole or guy wire.

19. A support structure for mounting an electrical device and for preventing undesired pests capable of climbing a gap of a predetermined size from reaching the electrical device without the need for chemical repellants, said structure comprising;

a support vehicle having a top edge and a bottom end, said top edge supportedly connected to said electrical device;

a sleeve having an inside surface for receiving said support vehicle in relative close fit tolerance and having an outer surface, said sleeve having a ground side end and an upper end, and said sleeve being disposed above ground on said support vehicle;

a projecting member secured to the ground side end of said sleeve and extending outwardly from said outer surface of said sleeve, said projecting member having an underside surface and an edge surface, and a topside surface, said underside surface, said edge surface, said topside surface, and said outer surface forming a first pathway for movement therealong by the crawling pest leading from beneath said projecting member to the upper end of said sleeve; and an obstacle member secured to the upper end of said sleeve and circumscribing the upper end of said sleeve for blocking movement of a pest along said first pathway, said obstacle member having an inside surface ending in an edge separated from said topside surface by a distance greater than said predetermined size, said inside surface providing a second pathway leading in a direction away from said upper end of said sleeve and away from said first pathway.

20. The support structure according to claim 19 wherein the height of said support vehicle is established according to the type of said pests to be precluded from said electrical device.

21. The pad support structure of claims 1, 20, or 21, wherein the inside surface of said obstacle member has a point of greatest diameter and tapers radially inwardly from its point of greatest diameter to its edge.

22. The pad support structure of claims 1, 19, or 20, wherein the edge surface of said projecting member extends at least as far radially outward as the edge of the inside surface of said obstacle member, each with respect to the outer surface of said sleeve.

23. The pad support structure of claims 1, 19, or 20, wherein said topside surface is planar.

24. The pad support structure of claims 1, 19, or 20, wherein said topside surface is free of liquid chemicals.

25. A pest preventer, for location on a pole or guy wire which is disposed between ground and a protectable area, and which prevents a crawling pest capable of climbing a gap of a predetermined size from reaching the protectable area via the pole or guy wire without the need for chemical repellents, and wherein sunlight emanates from an obtuse angle with respect to the pathway leading from ground to the protectable area, said preventer consisting essentially of:

a first member having an inside surface for receiving a pole in relative close fit tolerance and having an outer surface forming a first pathway for movement therealong by the crawling pest, said first member having a ground side end and an upper end, an obstacle member secured to said first member at said upper end and circumscribing said first member for blocking movement of a pest along said first pathway, said obstacle member having an inside surface ending in an edge separated from said outer surface by a distance greater than said predetermined size, said inside surface providing a second pathway leading in a direction away from said upper end of said first member and away from said first pathway, said obstacle member extending below said ground side end a sufficient distance to shadow said outer surface of said first member.

26. The pest preventer of claim 25, wherein the outer surface of said first member and the inside surface of said obstacle member are free of liquid chemicals.

27. The pest preventer of claim 25, wherein a portion of said preventer is located beneath the inside surface of said obstacle member and is adapted to be self-draining.

28. The pest preventer of claim 6, wherein the inside surface of said obstacle member has a point of greatest diameter and tapers radially inwardly from its point of greatest diameter to its edge.

29. A pest preventer, for location on an electrical facilitating structure, which prevents a crawling pest capable of climbing a gap of a predetermined size from reaching a protectable area via the structure without the need for chemical repellents, said preventer consisting essentially of:

a first surface bearing member for location on said structure for positioning a first surface with respect to ground for defining a first pathway for movement therealong by the crawling pest which a crawling pest must take in order to reach the protectable area from ground, said first surface disposed leading away from ground and toward the protectable area, said first surface bearing member having an end edge;

obstacle means secured along the entire extent of said end edge and including a second surface bearing member having a second surface depending towards the ground and having a bottom edge being spaced away from said first surface by a distance greater than said predetermined size, so as to prevent the pest from climbing onto the bottom edge of said second surface bearing member, said second surface confronting said first surface and being spaced apart from said first surface by a distance greater than said predetermined size at least for a portion of its extent, said obstacle means physically blocking pests from passing from said first pathway across said edge onto the structure, said second surface defining a second pathway being disposed in a direction leading away from said first pathway toward ground, said obstacle means cooperating with said first surface for generating a phototactic barrier along said first pathway by shadowing thereof.

30. A pest preventer, for location on a structure which is disposed between ground and a protectable area, and which prevents a crawling pest capable of climbing a gap of a predetermined size from reaching the protectable area via the structure without the need for chemical repellents, said preventer consisting essentially of:

a first surface positioned with respect to ground for defining a first pathway for movement therealong by the crawling pest which a crawling pest must take in order to reach the protectable area from ground, said first surface disposed leading away from ground, from the structure, and toward the protectable area, and having an end edge;

obstacle means secured along the entire extent of said end edge and including a second surface depending towards the ground and having a bottom edge being spaced away from said first surface by a distance greater than said predetermined size so as to prevent the pest from climbing onto the bottom edge of said second surface from said first surface, said second surface confronting said first surface and being spaced apart from said first surface by more than said predetermined size at least for a portion of its extent, said obstacle means physically blocking pests from passing from said first pathway across said edge onto the structure, said second surface defining a second pathway being disposed in a direction leading away from said first pathway toward ground to a point having an elevation different than the elevation of said end edge for discouraging continued movement by a pest along said second pathway toward ground when the pest is using -tactic response modes either individually, concurrently or serially, said obstacle means cooperating with said first surface for generating a phototactic barrier along said first pathway by shadowing thereof to discourage continued movement by the pest along said first pathway toward said protectable area when the pest is in a positive phototactic response mode or using ultraviolet light for navigational orientation, said obstacle means being disposed relative to said first surface for generating a geotactic barrier to disorient the pest's foraging for a source at a particular elevation, said first and second pathways being disposed relative to the direction of scent from the protectable area for discouraging the pest from movement along said first pathway toward said protectable area.

31. The pest preventer of claims 30 or 29, wherein a portion of said preventer is located beneath said second surface and is adapted to be self-draining.

32. The pest preventer of claims 30 or 29, wherein the second surface of said obstacle means has a point of greatest diameter and tapers radially inwardly from its point of greatest diameter to its bottom edge.

33. The pest preventer of claims 30 or 29, wherein said first surface and said second surface are free of liquid chemicals.

* * * * *